Patented Aug. 8, 1933

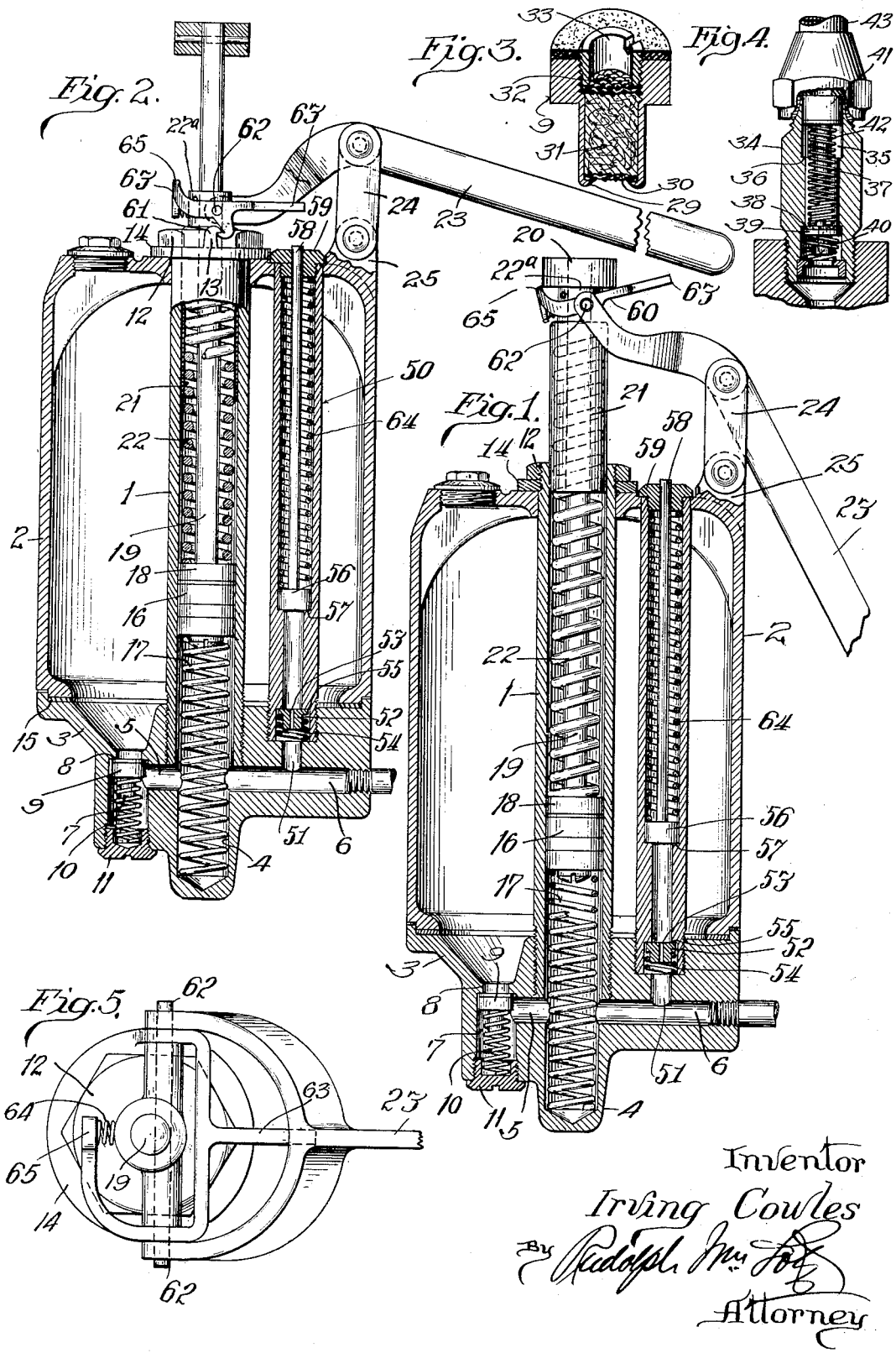

1,921,219

UNITED STATES PATENT OFFICE 1,921,219

FORCE-FEED LUBRICATION PUMP

Irving Cowles, Chicago, Ill., assignor to Union Bank of Chicago, Trustee, Chicago, Ill., a Corporation of Illinois Application September 28, 1927
Serial No. 221,197

28 Claims. (Cl. 184—28)

This invention relates to improvements in pumps adapted particularly for use conjointly or in combination with fluid pressure responsive members disposed at the bearings of machines and mechanisms to be supplied with lubricant under pressure and operating to shut off flow of lubricant to the bearings after the same shall have each received a substantially predetermined volume of said lubricant. Devices of this character are specifically illustrated and described in Letters Patent Nos. 1,652,764 and 1,652,765, and 1,693,068.

The particular object of the present invention will be best understood if the difficulties and problems attendant upon force feed lubrication of bearings under widely varying temperature conditions are understood, said difficulties being mainly as follows:

Lubricating oils of the type most commonly employed increases its viscosity as the temperature thereof is lowered. Hence, a force-feed lubrication system applied to machines or mechanisms which are used out of doors or where temperature conditions vary widely, must be adapted to successfully meet these conditions. In some instances, all of the bearings to be lubricated are subjected to the same temperature conditions, while in others, some bearings disposed near an engine or other source of heat are warm while others are very cold. This last-mentioned cold condition pertains to automotive vehicle chassis bearings.

In the force-feed systems, pumps of the reciprocable piston type are usually employed and said pumps are usually manually operated for the suction stroke and spring operated on the pressure stroke. The spring urged pressure stroke is desirable because it determines a substantially uniform pressure on the lubricant which pressure is well within the limit of endurance of the thin copper tubing usually employed to connect the pump with the aforesaid devices at the bearings.

But, obviously, in such pumps, the spring pressure may be augmented by manual pressure to increase pipe-line pressure to a point sufficiently high to rupture the tubing and this should be avoided.

On the other hand, and especially where the lubricant is of high viscosity and very slow-flowing, the manual suction stroke may be so much more rapid than the flow of oil permits as to cause the piston to be moved away from the oil column entering the cylinder and thus, in common parlance, pull a vacuum between the piston and the oil column. In that event, if the plunger be released before the oil column has filled this vacuum space, the spring will urge the piston against the column before the pump cylinder has been fully charged and thus an inadequate volume of oil will be fed to the tubing and devices at the bearings to permit the latter to function properly with the result that some of the bearings will receive charges of oil and others not. It is quite essential that the pump shall have a capacity in excess of the aggregate requirements of all bearings per discharge to the latter.

From the foregoing it will be obvious that a pump of the reciprocable type wherein the piston suction stroke is spring-urged in order to avoid the vacuum condition above-mentioned and whose piston is also spring-urged on its pressure or discharge stroke and may not be manually urged independently of either spring, affords the ideal type of pump for force-feed lubrication purposes for the reasons recited above and particularly in connection with the type of feed devices at the bearings above-mentioned.

Hence, the main and primary object of this invention is to provide a pump of the type defined in the next preceding paragraph.

A further important object of the invention is to provide a partially automatically controlled pump wherein the suction stroke automatically follows the pressure stroke in order that each suction stroke may consume as much time as the then viscosity of the oil demands so that, preceding the next discharge stroke of the piston, the pump cylinder may contain its full charge of oil; the pressure strokes being ordinarily relatively infrequent.

A pump embodying the present invention is illustrated in the accompanying drawing wherein:

Fig. 1 is a central longitudinal section of a pump constructed in accordance with the invention, showing the operating parts in initial or normal position.

Fig. 2 is a similar view showing the lever raised and the piston-actuating spring fully compressed for imparting a pressure stroke to the piston.

Fig. 3 is a sectional perspective view of the preferred form of suction valve used in the pump.

Fig. 4 is a central longitudinal section of an exemplary type of flow shut-off device through which oil is fed to a bearing.

Fig. 5 is a fragmentary plan view of the pump showing the latch mechanism employed.

In the instance illustrated, the pump cylinder 1 is disposed axially of a tank 2, the bottom of which consists of a casting 3 having a central pocket 4 constituting the lower end portion of the pump proper, and from which lateral intake and discharge ports 5 and 6, respectively, lead. The port 5 connects with the intake chamber 7 provded at its upper end with a valve seat 8 for the suction valve 9 which is held to said seat by means of the compression spring 10 resting on the plug 11 which seals the lower end of said chamber 7.

The pump cylinder 1 is threaded into or otherwise mounted in the upper end of the pocket 4 and, at its upper end projects through a central opening in the top wall of the tank 2, said upper end being threaded to receive a nut 12. A latch element 13 constituting a portion of a washer 14 is clamped between said nut 12 and the top wall of the tank, said nut serving to compress the lower edge of the circumferential wall of the tank against the gasket 15 carried by the casting 3.

Disposed within the cylinder 1 is a trunk piston 16 which is normally held at the end of its suction stroke by means of a compression spring 17 capable of exerting a pressure of approximately fifteen pounds per square inch.

Reciprocable in the upper end portion of the cylinder 1 is a loosely fitting disk 18 mounted upon the lower end of a plunger rod 19 which, at its upper end carries a collar 20 which constitutes a trip element. Said rod 19 passes through a central opening in the upper wall of a sleeve 21 which is reciprocable in the cylinder 1, a helical compression spring 22 being confined between the disk 18 and the upper wall of said sleeve, said spring being normally partially compressed and of far greater strength than the spring 17. Disposed between the top of sleeve 21 and the collar 20 is a collar 22ª slidable on the rod 19 and pivotally associated with the ends of the arms of a lever 23. The latter is pivotally connected between its ends with the upper ends of a pair of links 24, which, at their lower ends, are pivotally connected with a lug 25 on the tank 2. The lever is preferably substantially L-shaped so that, when in its normal position as shown in Fig. 2, its outer or manually engageable end portion depends and lies in proximity to the circumferential wall of the tank.

The suction valve 9 is preferably hollow and provided with an inturned annular flange 29 at its lower end upon which a strainer 30 is supported. A filter plug 31 of felt or the like is mounted upon said strainer 30 and is confined between the same and a similar strainer 32, the latter being compressed against the filter plug by means of the sleeve-nut 33 threaded into the upper end of the valve, said sleeve serving also as a means for adjusting the density of the filter plug 31 for reasons hereinafter pointed out.

In Fig. 4 I have illustrated an exemplary type of device for feeding bearings adapted to be used in connection with the pump. This consists of a casing 34 having a cylindrical bore 35 in its upper end which terminates at the valve seat 36 bordering the upper end of a smaller bore 37. This terminates at the valve seat 38 for the check valve 39 which is held to said seat by the spring 40.

A piston valve 41 is reciprocable in the bore 35 and is normally held at the upper limit of its movement by the spring 42 which rests upon the check valve 39 and is very much weaker than the spring 40. The valve 41 is of sufficiently smaller diameter than the bore 35 to permit resisted leakage of oil past the same.

Assuming the chamber between the valves 39 and 41 to be filled with oil as is also the tubing 43 connecting the bore 35 with the discharge port 6 of the pump, then as the piston 16 is urged on its pressure or discharge stroke by the spring 22, oil under pressure will enter the bore 35 above the valve 41 far more rapidly than it can leak past said valve, it being obviously necessary that the pressure exerted on the oil by the piston 16 will be sufficient to overcome the resistance of the spring 40, and hence, said piston valve 41 will thus be forced to the valve seat 36. When thus seated, a part of the oil between the valves 39 and 41 will have been discharged from the casing 34 and further flow from the latter will now be shut-off. Ordinarily a relatively large number of the devices illustrated in Fig. 4 will be fed by the pump, the capacity of the latter being in excess of the aggregate requirements of all of said devices.

The latter operate as above described unless the discharge of oil from a casing 34 is resisted by a very tight or frozen bearing. If such discharge is sufficiently resisted, then the initial movement of the valve 41 will cause pressures above and below the same to be equalized substantially and velocity of flow into the casing 34 to be reduced to equalize flow into the tight bearing. Thus flow through the casing will not be shut off but will remain constant until the piston 16 has reached the end of its discharge stroke. The check valves 39 will obviously prevent flow of oil back from the casings 34 and tubing into the pump, but upon relief of pump pressure by suction stroke of the piston 16, will permit the valves 41 to be spring-urged to their initial positions, the oil in the valves 41 being transferred to below the same by leakage during this return movement of said valves 41.

The maximum pressure exerted on the oil by the piston 16 under the influence of the spring 22 is further determined by the density of the filter plug in the suction valve through which the surplus oil discharged from the cylinder 1 is returned, at least in part, to the tank 2. If all of the valves 41 in the system become seated to shut off all further flow as above-described, then all of the surplus oil discharged from cylinder 1 will be returned to the tank 2 through said filter plug, whereas if one or more of said valves 41 are prevented from seating by reason of tight bearings, then only a part of the surplus oil will be returned through the filter plug, the latter causing pump pressure to be maintained during an appreciable time interval to insure a plentiful flow into the tight bearing or bearings.

The valve 9, as shown in Fig. 3, consists of a substantially tubular member containing a filter plug 31 confined between screens 30 and 32. This permits of seepage of oil back into the tank 2 under the influence of pressure in the discharge lines of the system to relieve pressure in the latter.

I provide in the tank 2 a second pump cylinder 50 which is mounted upon the base and is fed with lubricant through an opening or port 51 communicating with the discharge port 6 between the ends of the latter. A spring-held check-valve 52 which is provided with a central opening 53 of small diameter is held by spring 54 against the valve-seat 55 at the lower end of the cylinder. In the latter, I provide a piston 56 which normally rests upon the annular shoulder 57 between the ends of said cylinder, the stem 58 of said piston extending through an opening in the closure plug 59 at the upper end of the cylinder.

The latch member or dog 60 which co-acts with the latch formations 13 at opposite sides of the washer 14, is pivotally mounted between its ends on the trunnions 62 of the collar or sleeve 22ª, with which the fork of the operating lever 23 is pivotally connected, said dog terminating at its other end in an arm 63 disposed in the fork of the lever and in the path of the stem 58 of the piston 56 so that, as the latter is moved upwardly under the influence of lubricant under pressure entering the lower end of the cylinder 50, it will strike the arm 63 of the dog 60 and release the latter. This movement of the stem 58 and piston 56 is resisted by the spring 64, which exerts a pressure on piston 56 considerably less than is exerted upon the piston 16 of the cylinder 1 by its spring 22. The cylinder 50 is also of smaller diameter than the cylinder 1 so that a relatively small volume of lubricant is required to move the piston 56 sufficiently to trip the dog 60. This movement of said piston 56 is rendered relatively slow by reason of the small diameter of the opening 53 in the check-valve 52, while the reverse or discharge stroke of said piston 56 is rendered rapid by unseating of the said check-valve.

The spring 64 is normally under such compression that it will resist movement of the piston 56 under a pressure far in excess of that required to seat the valves 41 but less than the maximum pressure developed after closure of the valves 41, said piston 56 and spring 64 determining that maximum. The slow movement of the piston 56 will serve to maintain the maximum line pressure for a time interval which will vary with the viscosity of the lubricant and will be somewhat affected by leakage to tight bearings as above described.

In place of the opening 53, a filter plug may be used to further retard flow into cylinder 50 and also to obviate possibility of clogging, this modification being omitted from illustration as an obvious expedient and also as being disclosed in the suction valve.

It will be obvious that the plunger rod 19 may be directly connected with the piston 16 without rendering the structure inoperative but, in order to prevent possibility of manual actuation of the piston on its suction stroke, it is preferable that these members be detached from each other.

In the structure shown in Figs. 1 and 2, the member 20 or its equivalent at the upper end of the plunger may be used as a secondary trip element for the dog 60 co-operating with the projection 65 of the latter so that, in event that any one of the devices at the bearings should for any reason become inoperative to shut off flow to a normal or loose bearing, or there should be a break in the piping, either of which contingencies may act to prevent development of sufficient pressure to actuate the piston of cylinder 50 to effect tripping, the rapid restoration of the plunger to normal position will act to advise the driver of an abnormal condition in the lubricating system.

Attention is directed to the fact that the pump herein illustrated and described may be used to advantage in connection with devices wherein the flow of lubricant to the bearings is resisted as by the use of filter plugs or other flow resisting means disposed in feed devices associated with the bearings, such devices being exemplified in certain patents granted to Joseph Bijur, one of said patents being No. 1,632,772, dated June 14, 1927.

Obviously the pump per se may be otherwise associated with a tank than in the particular manner illustrated and other details of construction varied to suit particular needs and conditions without departing from the invention as defined in the appended claims.

The operation of the pump is as follows: Assuming the parts to be in the position shown in Fig. 1, with the piston 16 at the end of its suction stroke, then upon swinging the lever 23 to the position shown in Fig. 2, the sleeve 21 will be forced to the lower limit of its movement, thereby to compress the spring 22. The latch member or dog 60 is now engaged with the latch elements 13 and serves to prevent the sleeve 21 from being returned to its normal position so that the spring 22 now acts to operate the rod 19 and trunk piston 16 to force contained oil out of the cylinder 1 through the lateral duct 6 into the feed pipes for the bearings to be lubricated. Such part of the oil as is not fed to the bearings passes upwardly through the duct 61 into the small cylinder 50 and forces the piston 56 upwardly against the action of the spring 64. The piston rod 58 now strikes the latch member 60 and releases it from engagement with the elements 13 so that the sleeve 21 is instantly returned to the upper limit of its movement determined by the collar 22ª. The spring 22 is now inert so that the trunk piston 16 may be returned to the end of its suction stroke by the spring 17, the cylinder 1 being thus recharged with oil. Obviously a part of this oil will be discharged from the small cylinder 50 which has received only the surplus portion of the preceding charge. As the suction stroke of the trunk piston 16 is effected only by the spring 17 and the latter exerts a pressure not exceeding normal atmospheric pressure, there is no danger of movement of said piston away from the oil flowing into cylinder 1 in the event that such flow is rendered sluggish because of increased viscosity of the oil due to cold weather.

The operator thus controls only the discharge of oil to the bearings, the pump cylinder being always filled unless the operations of the lever 23 occur in too rapid succession.

I claim as my invention:

1. In a lubricating system including spring-held fluid pressure responsive devices associated with bearings for automatically shutting off flow to the latter after discharge thereto of some lubricant, a pump for feeding said devices including a cylinder, a piston therein, a spring normally maintaining said piston at the end of its suction stroke, a plunger for urging said piston against the action of said spring, a second spring associated with said plunger, manually operable means associated with said second spring for compressing the same, thereby to actuate said plunger as aforesaid, trip mechanism including co-acting latch elements associated with said cylinder and said means for holding the latter against return movement from a given point in its spring compressing movement, a trip element on said plunger adapted to release said trip mechanism at a given point in the movement of said plunger responsively to the pressure of the second spring, and means associated with said cylinder and devices for permitting leakage of lubricant following shut off of flow to the bearings, thereby to permit said piston and plunger to move on to the point of release of said trip mechanism while maintaining pressure on the lubricant.

2. In a lubricating system including spring-held fluid pressure responsive devices associated with bearings for automatically shutting off flow to the latter after discharge thereto of some lubricant, a pump for feeding said devices including a cylinder, a piston therein, a spring normally maintaining said piston at the end of its suction stroke, a plunger for urging said piston against the action of said spring, a second spring associated with said plunger, manually operable means associated with said second spring for compressing the same to actuate said plunger as aforesaid, automatic trip mechanism associated with said pump for permitting spring return of the piston to its normal position upon attaining a given point in its pressure stroke, and means permitting leakage of lubricant from the pressure end of the system, thereby to permit the piston to attain said last-named point following shut off of flow to the bearings.

3. In a lubricating system including spring-held fluid pressure responsive devices associated with bearings for automatically shutting off flow to the latter after discharge thereto of some lubricant, a pump for feeding said devices including a cylinder, a piston therein, a spring normally maintaining said piston at the end of its suction stroke, a plunger for urging said piston against the action of said spring, a second spring associated with said plunger, manually operable means associated with said second spring for compressing the same, thereby actuating said plunger as aforesaid, means subjected to pressure as said piston is urged on its pressure stroke for effecting discharge of surplus lubricant after shut off of flow to the bearings, thereby to permit said piston to attain a given point in said stroke, and trip mechanism associated with the pump mechanism for automatically interrupting pressure on the piston, thereby to permit spring return of the latter to its initial position.

4. In a lubricating system including spring-held fluid pressure responsive devices associated with bearings for automatically shutting off flow to the latter after discharge thereto of some lubricant, a pump for feeding said devices including a cylinder, a piston therein, a spring normally maintaining said piston at the end of its suction stroke, a plunger for urging said piston against the action of said spring, a second spring associated with said plunger, manually operable means associated with said second spring for compressing the same, thereby to actuate said plunger as aforesaid, means subjected to pressure as said piston is urged on its pressure stroke for effecting discharge of surplus lubricant after shut off of flow to the bearings, thereby to permit said piston to attain a given point in said stroke, and trip mechanism associated with the pump mechanism for automatically restoring the pump mechanism to its initial position.

5. In a lubricating system including spring-held fluid pressure responsive devices associated with bearings for automatically shutting off flow to the latter after discharge thereto of some lubricant, a pump for feeding said devices including a cylinder, a piston therein, a spring normally maintaining said piston at the end of its suction stroke, a plunger for urging said piston against the action of said spring, a second spring associated with said plunger, manually operable means associated with said second spring for compressing the same, thereby to actuate said plunger as aforesaid, and fluid pressure controlled spring-held trip mechanism associated with the pump mechanism for automatically effecting restoring of the latter to normal position as said piston attains a given point in its pressure stroke.

6. A pump including a cylinder, a piston therein, springs disposed on opposite sides of said piston for urging the same in respectively opposite directions, manually operable means associated with one of said springs for compressing the same against said piston to overcome the resistance of the other spring, spring-held means for latching said manually operable means against the action of the spring associated therewith, and fluid pressure controlled means for releasing said latching means as said piston attains a substantially predetermined point in its movement under the influence of said last-named spring.

7. A pump including a cylinder, a piston therein, springs arranged on opposite sides of the latter for urging the same in respectively opposite directions, a plunger associated with one of said springs, manually operable means associated with the latter for compressing the same, thereby to effect simultaneous movement of said piston and plunger in one direction, latching means for holding said manually operable means at the point in the movement thereof whereat said last-named spring is under its greatest compression, a member carried by said plunger for automatically releasing said latching means as said plunger attains a predetermined position under the influence of said spring, and fluid pressure actuated means associated with said pump and said latching means for tripping the latter.

8. A pump including a cylinder, a piston therein, springs arranged on opposite sides of the latter for urging the same in respectively opposite directions, a plunger associated with one of said springs, a member slidable relatively to said plunger and engaged with said spring for compressing the latter thereby to force said plunger and piston in one direction, manually operable means operatively associated with said slidable member for actuating the same, latching means for automatically holding said manually operable means at one limit of its movement against the action of both said springs, and a member carried by said plunger for automatically releasing said latching means as said plunger attains one limit of its movement, and fluid pressure actuated means associated with said cylinder and said latching means for tripping the latter independently of said member on said plunger.

9. A pump including a cylinder, a piston therein, a spring for normally holding the latter at the end of its suction stroke, a spring arranged on the other side of said piston, means associated with said second spring for maintaining the same partially compressed and at the same time inert relatively to exerting pressure on said piston, a manually operable device associated with said means for forcing said second spring to exert pressure on said piston and further compressing the same proportionately to the resistance to movement of said piston, latching means associated with said device for holding the latter at one limit of its movement against the action of both said springs, and fluid pressure responsive latch releasing means operatively associated with said latching means for automatically releasing said device during travel of said piston under the influence of said second spring.

10. A pump including a cylinder, a piston therein, a spring normally maintaining said piston at the end of its suction stroke, means for urging said piston on its pressure stroke, latch mechanism associated with said means for holding the same against return until said piston attains the limit of its pressure stroke, and fluid pressure responsive means associated with said cylinder for automatically tripping said latch mechanism.

11. A pump including a cylinder, a piston therein, a spring normally maintaining said piston at the end of its suction stroke, means for urging said piston on its pressure stroke, latch mechanism associated with said means for holding the same against return until said piston attains the limit of its pressure stroke, a second cylinder, a piston therein, a spring normally maintaining said piston in a given position, connection between the discharge end of the first-named cylinder and the intake end of the second cylinder for admitting fluid under pressure to the latter to move said second piston against the action of its spring, and means associated with said second piston for tripping said latch mechanism as said second piston attains a predetermined position in said second cylinder.

12. A pump including a cylinder, a piston therein, a spring normally maintaining said piston at the end of its suction stroke, means for urging said piston on its pressure stroke, latch mechanism associated with said means for holding the same against return until said piston attains the limit of its pressure stroke, and a spring-held fluid pressure responsive member associated with the discharge end of said cylinder and with said latch mechanism for automatically releasing the latter.

13. A pump including a cylinder, a piston therein adapted to be urged on its pressure stroke, a spring normally maintaining the same at the end of its suction stroke, latch mechanism operatively associated with said piston for holding it against actuation by said spring after a pressure stroke has been imparted thereto, and fluid pressure responsive mechanism associated with the discharge end of said cylinder and with said latch mechanism for automatically releasing the latter.

14. A pump including a cylinder, a piston therein adapted to be urged on its pressure stroke, a spring normally maintaining the same at the end of its suction stroke, latch mechanism operatively associated with said piston for holding it against actuation by said spring after a pressure stroke has been imparted thereto, means associated with said cylinder and bearings to be lubricated for automatically shutting off flow to the latter following discharge of some lubricant into the latter, and a fluid pressure responsive member associated with the discharge end of said cylinder and with said latch mechanism and operable by surplus of lubricant discharged from the cylinder following interruption of flow to the bearings for automatically releasing said latch mechanism.

15. In a lubricating system including devices associated with bearings to be lubricated for automatically shutting off flow to the latter after each thereof has received a substantially predetermined volume of lubricant, a pump including a cylinder equipped with a piston spring-held at the end of its suction stroke and adapted to deliver at each full pressure stroke of said piston a volume of lubricant in excess of the aggregate delivered to the bearings, means for urging said piston on the pressure stroke, latch mechanism operatively associated with said piston for retaining the same against return movement following its actuation by said means, and fluid pressure responsive mechanism associated with said latch mechanism and with the discharge end of said cylinder for actuation by surplus lubricant delivered from the latter to automatically release said latch mechanism.

16. A pump including a pump cylinder, a floating piston therein, springs disposed on opposite sides thereof for urging said piston in respectively opposite directions, a lever operatively associated with one of said springs for compressing the same against said piston to urge it on its discharge stroke against the action of the other spring, a storage cylinder for receiving surplus oil from the pump cylinder and connected with the discharge end of the pump cylinder for returning surplus oil to the latter, and a spring-held piston in said storage cylinder for automatically discharging fluid therefrom.

17. A pump including a pump cylinder, a floating piston therein, springs disposed on opposite sides thereof for urging said piston in respectively opposite directions, a lever operatively associated with one of said springs for compressing the same against said piston to urge it on its discharge stroke against the action of the other spring, a storage cylinder associated with said pump cylinder, and a spring-held piston therein resisting entry of fluid to said storage cylinder, latch mechanism operatively associated with said lever to hold it at the end of its spring compression stroke, and trip mechanism operatively associated with said piston of said storage cylinder and said latch mechanism for automatically releasing the latter at some point in the pressure stroke of the first-named piston.

18. A pump including a pump cylinder, a floating piston therein, springs disposed on opposite sides thereof for urging said piston in respectively opposite directions, a lever operatively associated with one of said springs for compressing the same against said piston to urge it on its discharge stroke against the action of the other spring, a storage cylinder associated with said pump cylinder, and a spring-held piston therein resisting entry of fluid to said storage cylinder, latch mechanism operatively associated with said lever to hold it at the end of its spring compression stroke, and fluid pressure responsive trip mechanism associated with the storage cylinder and said latch mechanism for automatically releasing the latter at some point in the pressure stroke of the first-named piston.

19. A pump comprising a cylinder, a piston therein, a spring for urging said piston to discharge fluid, a storage cylinder connected with the discharge end of said pump cylinder to receive oil from the latter, a spring-held piston in said storage cylinder maintained at the end of its discharge stroke, thereby to return stored oil to the pump cylinder as the piston of the latter makes its suction stroke, and a lever associated with the spring of the pump cylinder for compressing the said spring against said piston.

20. A pump comprising a cylinder, a piston therein, a spring for urging said piston to discharge fluid, a spring for urging said piston on its suction stroke, a lever for compressing the first-named spring to overcome the resistance of the second spring, a storage cylinder connected with the discharge end of the pump cylinder to receive oil from the latter, and a spring-held piston in said storage cylinder for resisting flow of fluid into the latter and for returning stored oil to the pump cylinder as the piston of the latter makes its suction stroke.

21. In a lubricating system of the type defined, a pump comprising a cylinder, a piston therein, a spring for urging said piston to discharge fluid, a storage cylinder connected with the discharge end of said pump cylinder for receiving surplus oil not discharged into the bearings, a spring-held piston in said storage cylinder normally maintained at the end of its discharge stroke, a lever associated with the spring of the pump cylinder for compressing the same against said piston, and means permitting resisted discharge of the surplus oil from said storage cylinder into the pump cylinder as the piston of the latter makes its suction stroke.

22. The combination with means disposed upon bearings to be lubricated for limiting the volume of lubricant delivered to the same, of a piston pump adapted to supply a volume of lubricant in excess of the aggregate volume determined by said means at each full discharge stroke of the piston of said pump, a pressure storage chamber arranged to receive and hold excess lubricant discharged from said pump and to discharge the same under pressure upon relief of pump pressure, and means associated with said chamber for causing said excess lubricant to be discharged therefrom as said pump pressure is relieved.

23. The combination with means disposed upon bearings to be lubricated for limiting the volume of lubricant delivered to the same, of a piston pump adapted to supply a volume of lubricant in excess of the aggregate volume determined by said means at each full discharge stroke of the piston of said pump, a pressure storage chamber arranged to receive and hold excess lubricant discharged from said pump and to discharge the same under pressure upon relief of pump pressure, a discharge port for said excess lubricant, and means associated with said discharge port for resisting passage of lubricant therefrom under the influence of the pressure exerted on the latter in said chamber.

24. The combination with means disposed upon bearings to be lubricated for limiting the volume of lubricant delivered to the same, of a piston pump adapted to supply a volume of lubricant in excess of the aggregate volume determined by said means at each full discharge stroke of the piston of said pump, a flow-resistant relief port and a pressure storage chamber for receiving excess lubricant discharged from said pump coacting to effect a gradual discharge of said excess lubricant following relief of pump pressure.

25. In a lubricating system, a pump equipped with a spring-pressed piston for discharging fluid under a degree of pressure determined by the said spring, and fluid pressure responsive means for automatically relieving the spring pressure on said piston prior to completion of the full normal discharge stroke of said piston.

26. In a lubricating system, a pump, a piston therein, a spring for urging the piston on its suction stroke, a more powerful spring for urging the same on its pressure stroke, means for compressing the last-mentioned spring, and fluid pressure responsive means for automatically limiting the pressure stroke of the said piston to less than the full predetermined normal discharge stroke thereof and thereupon relieving the same of the pressure of the last-named spring.

27. In a lubricating system a pump equipped with a spring-pressed piston for discharging fluid under a degree of pressure determined by the said spring, and fluid pressure responsive means fed by said pump for automatically relieving the spring pressure on said piston prior to completion of the full normal discharge stroke of said piston.

28. In a lubricating system, a pump, a piston therein, a spring for urging the piston on its suction stroke, a more powerful spring for urging the same on its pressure stroke, means for compressing the last-mentioned spring, and fluid pressure responsive means fed by said pump for automatically limiting the pressure stroke of the said piston to less than the full predetermined normal discharge stroke thereof, and thereupon relieving the same of the pressure of the last-named spring.

IRVING COWLES.